United States Patent Office 3,271,850
Patented Sept. 13, 1966

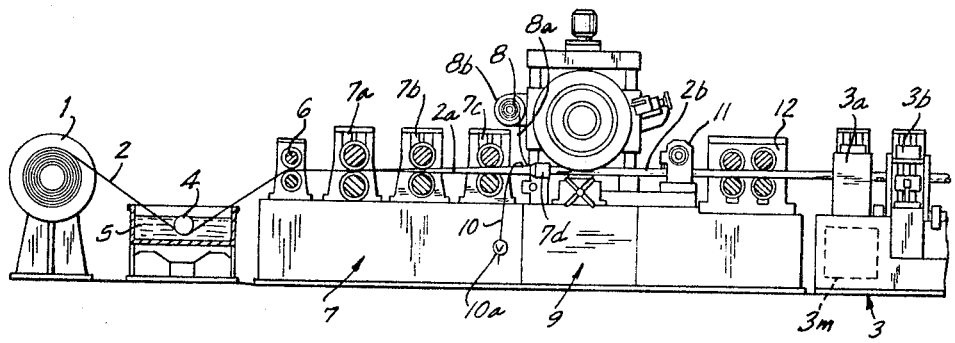

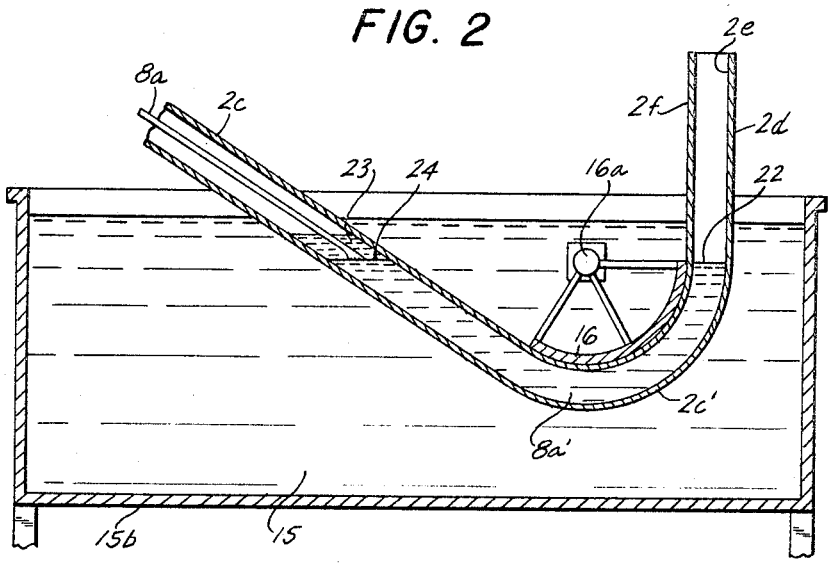
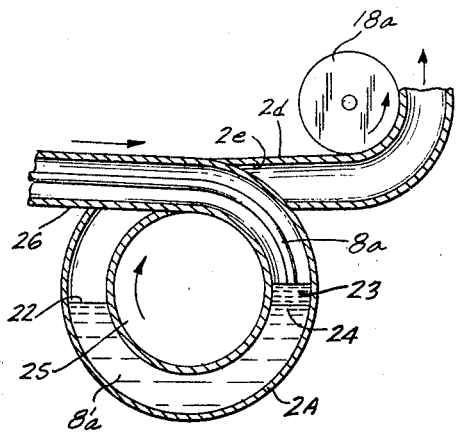
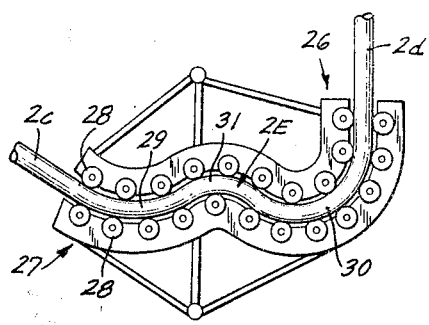

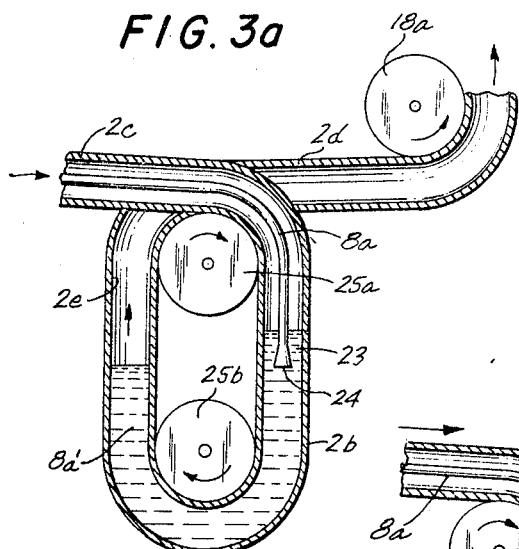
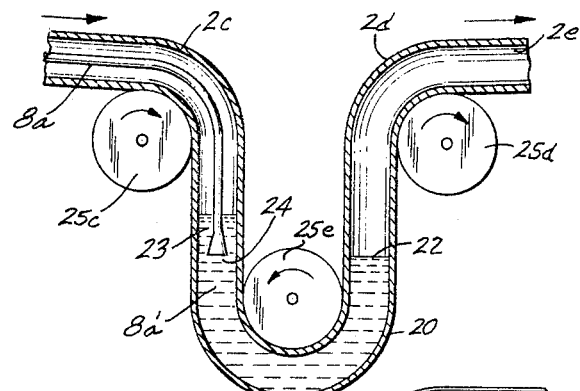
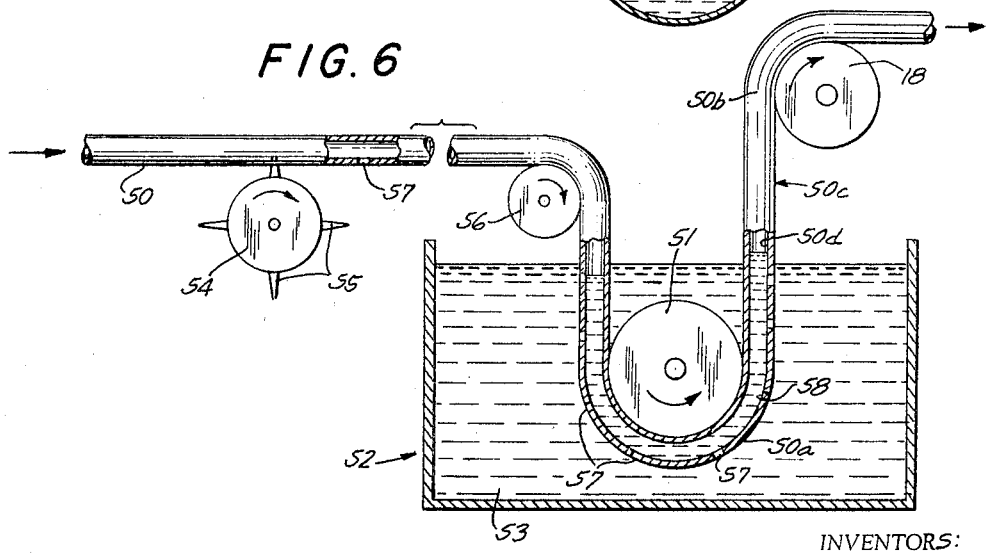

3,271,850
PROCESS AND APPARATUS FOR THE PRODUCTION OF PLATED PIPE
Heinrich Menne and Wolfgang Weinreich, Paderborn, Germany, assignors to Benteler-Werke A.G., Schloss Neuhaus, Germany
Filed Oct. 2, 1963, Ser. No. 313,246
Claims priority, application Germany, Oct. 4, 1962, B 69,083
32 Claims. (Cl. 29—460)

The present invention relates to the production of metallic pipe in general, and more particularly to a process and apparatus for the production of continuous pipe with internal and/or external coats of metallic material. Still more particularly, the invention relates to a process and apparatus for continuously producing small-caliber pipe which consists of steel or another metallic material and which is automatically plated with internal and/or external coats of corrosion-resistant nonferrous metallic material.

It is an important object of our invention to provide an improved process for the application of external and/or internal coats to continuously advancing seam-welded or seamless pipe by the so-called hot-dip method.

Another object of the invention is to provide a process according to which the pipe may be provided simultaneously with internal and external coats of nonferrous metallic material without necessitating any interruptions in endwise movement of the continuously formed pipe.

A further object of the invention is to provide a process according to which the pipe may be provided simultaneously with internal and external coats of identical or different materials and according to which the thickness of internal and/or external coats may be controlled with utmost accuracy and in a fully automatic way.

An additional object of our invention is to provide an improved process for zinc plating of small-caliber steel pipe according to which seam-welded or seamless pipe may be provided with internal and/or external coats at the same rate at which it issues from a continuously operating seam welding or drawing apparatus.

Still another object of the invention is to provide a process of the above outline characteristics according to which the thickness and consistency of internal and/or external coats on continuously advancing seam-welded or seamless pipe may be controlled in a very simple manner.

A concomitant object of the invention is to provide a process for coating the internal surface of a continuous seamless pipe in such a way that the resulting product may be subdivided without waste into sections of requisite length and that the introduction of coating or plating material into the interior of such seamless pipe may take place at the same speed at which the pipe issues from a rolling or drawing mill.

A further object of the invention is to provide a novel apparatus for the production of continuous lengths of metallic pipe and for simultaneous plating of internal and/or external surfaces of the pipe.

Another object of the invention is to provide an apparatus of the just outlined characteristics which may be rapidly adjusted to provide the pipe with coats of different thicknesses, of different consistencies and/or different materials.

An additional object of the invention is to provide in the improved apparatus a novel arrangement which is capable of simultaneously coating the internal and external surfaces of a continuously advancing seam-welded or seamless pipe.

Still another object of our invention is to provide an apparatus of the above outlined characteristics which is constructed and assembled in such a way that it automatically regulates the delivery of coating material to the interior of a seam-welded or seamless pipe while the pipe moves endwise in a predetermined path.

An additional object of the invention is to provide an apparatus wherein the pipe is automatically calibrated, cleaned and fluxed prior to the formation of internal and/or external coats.

With the above objects in view, one feature of our invention resides in the provision of a process for the production of internally plated small-caliber metallic pipe with a diameter of less than 20 mm. which comprises the steps of producing a seamless or seam-welded metallic pipe in a continuous operation and advancing the thus produced continuous length of pipe endwise along an elongated path which is preferably horizontal and an intermediate portion of which is located at a level below the portions which are located upstream and downstream of such intermediate portion (as seen in the direction of endwise movement of the pipe), feeding a nonferrous metal into the interior of the pipe in a zone located upstream of the intermediate portion of the path so that such plating metal advances in the same direction as the pipe, and heating that section of the pipe which advances along the intermediate portion of the path to a temperature which is sufficient to maintain the plating metal in molten condition but which is to low to cause evaporation of molten plating metal whereby the plating metal forms a pool which automatically coats the pipe so that the internal surface of the pipe emerging from the intermediate portion of the path is plated with a coat of metallic material.

It is preferred to select the temperature of molten plating metal in such a way that the pipe section advancing along the intermediate portion of the path is heated to subcritical annealing temperature or slightly above such temperature and is more readily bendable to follow the outline of the intermediate portion of the path. Thus, in addition to melting the plating metal, the heating step restores malleability and ductility of the pipe so that the pipe section advancing through the heating zone may assume the form of an undulated, convoluted or U-shaped body which accommodates the pool of molten plating metal. For example, and if the plating metal is zinc (melting point 419.4° C., boiling point 907° C.), the pipe section which accommodates the pool of molten zinc may be heated to 700° C. at which temperature the material of a steel pipe is sufficiently ductile to follow the outlines of an undulated, cylindrical or U-shaped bending device which is adjacent to the intermediate portion of the path. If the plating metal is tin (melting point 231.85° C., boiling point 2260° C.), the aforementioned temperature of about 700° C. is equally satisfactory. Of course, the temperature which prevails in the heating zone will depend on the nature of the material of the pipe and on the nature of plating metal. As a rule, the temperature is always above the melting point but below the boiling or evaporation point of the plating metal and is selected in such a way that it restores malleability and ductility of the pipe.

The novel features which are considered as characteristic of the invention are set forth in particular in the appended claims. The improved apparatus itself, however, both as to its construction and its method of operation, together with additional features and advantages thereof, will be best understood upon perusal of the following detailed description of certain specific embodiments with reference to the accompanying drawings, in which:

FIGS. 1a and 1b are partly elevational and partly vertical sectional views of an apparatus for the production of fusion-welded pipe which is formed with a straight seam and which is coated with internal and external layers of corrosion-resistant nonferrous metal in accordance with the improved hot-dipping process of our invention;

FIG. 2 is an enlarged vertical section through the hot-dipping station of the apparatus which is shown in FIGS. 1a and 1b.

FIG. 3 is a side elevational view of a modified bending device which may be utilized in the apparatus of FIGS. 1a and 1b;

FIG. 3a is a side elevational view of a composite bending device which may replace the bending device of FIG. 2 or 3;

FIG. 3b is a side elevational view of another composite bending device;

FIG. 4 is a side elevational view of a third composite bending device which causes a section of the pipe to assume an undulated shape while the pipe passes through a bath of non-ferrous metallic material;

FIG. 5 is a fragmentary side elevational view of a second apparatus which is used for the application of corrosion-resistant metallic coats to internal surfaces of seamless pipes; and FIG. 6 is a fragmentary side elevational and partly sectional view of a third apparatus which constitutes a modification of the apparatus shown in FIG. 5.

Referring to the drawings, and first to FIG. 1a, there is shown a source of convoluted steel strip stock which assumes the form of a spool or reel 1 and which is arranged to pay out a continuous strip 2 of flat steel. This strip advances endwise through a bath 5 of liquid or liquefied treating medium such as molten flux (a mixture of zinc chloride and ammonium chloride), a solution of flux in water, or a degreasing substance (e.g., petroleum or trichloroethylene). For the sake of simplicity, the medium forming the bath 5 will be called flux. On its way through the bath 5, the strip 2 advances beneath a first deflecting roll 4 and toward and between the cutters of a trimming shear 6 to be transformed into a trimmed strip which is thereupon caused to pass through a forming or curling mill 7 including a series of pairwise arranged forming rolls 7a, 7b, 7c whereby the trimmed strip is transformed into a slotted pipe 2a. This slotted pipe then passes through a welding station 9 which includes a welding bell 7d serving as a means for completing the curling of the slotted pipe 2a and for providing the pipe with a straight seam so that the slotted pipe is transformed into a seam welded pipe 2b. The pairs of forming rolls 7a, 7b, 7c may be mounted to rotate freely at the speed of the slotted pipe 2a, or, alternatively, they may be combined with suitable braking means (particularly induction brakes or shunt-wound D.-C. motors) which tend to slow down and to subject the slotted pipe 2a to a stretching force. The means for advancing the slotted pipe 2a endwise along a horizontal path comprises a cold rolling or reducing mill 3 which is located downstream of the forming mill 7. The mill 3 includes a series of pairwise arranged power-driven rolls 3a, 3b, 3c, 3d which are angularly displaced with reference to each other, always through 90 degrees. The gaps defined by the pairs of rolls 3a, 3b, 3c are of oval shape and the mill 3 does not comprise any means which would tend to impart to the pipe 2b a circular shape while the pipe travels between the rolls 3a–3b, 3b–3c or 3c–3d. The arrangement is such that the speed of the rolls 3b exceeds the speed of the rolls 3a, that the speed of the rolls 3c exceeds the speed of the rolls 3b, and that the speed of the rolls 3d exceeds the speed of the rolls 3c. The difference between these speeds is greater than the extent of automatic elongation of the pipe 2b so that, while advancing through the cold rolling mill 3, the pipe is actually stretched in stepwise fashion and beyond the elastic yield limit of its material. The gap defined by the rolls 3d is of circular outline so that the pipe 2b passing beyond these rolls is of circular shape; therefore, the rolls 3d can be said to constitute a first calibrating device. The cold rolling mill 3 causes the pipe 2b to reduce its diameter by up to 80 percent while the wall thickness of the ultimate product remains substantially unchanged, i.e., the wall thickness of the pipe 2b leaving the rolls 3d may be substantially the same as the thickness of the strip 2.

The welding station 9 which is located between the mills 7 and 3 accommodates a suitable seam welding apparatus and this welding apparatus is preceded by a source of nonferrous coating or plating metal which assumes the form of a reel 8 arranged to pay out a continuous rod or wire 8a of zinc which is led through the slot of and into the interior of the partially formed pipe 2a at a point ahead of the welding bell 7d so that the wire 8a is enclosed in the pipe 2b and advances therewith through the mill 3. In the illustrated embodiment, the welding apparatus is of the resistance welding type and includes a conduit 10 which supplies a reducing gas, e.g. hydrogen or carbon monoxide (or an inert gas, such as argon) and which is provided with a control valve 10a.

The welding station 9 is followed by a scale remover 11 which also removes some of the seam so that the outline of the pipe 2b is smooth and is ready to be coated at the time it reaches a deforming device 12 which causes the pipe 2b to assume a shape deviating slightly from a true circular outline. This deforming device 12 is located immediately upstream of the first pair 3a of cold forming rolls and includes two pairs of idler rolls which need not be angularly displaced with reference to each other. The purpose of the deforming device 12 is to take up such shocks and twisting stresses to which the pipe 2b is subjected while it passes through the cold rolling mill 3 and to prevent such stresses and shocks from being transmitted to that portion of the partially formed pipe 2a which passes through the welding apparatus. It is to be noted that the entire length of the work extending from the rolls 7a to the rolls 3d is under stretch. The mill 3 removes any remaining scale and provides the pipe 2b with a smooth external surface which is ready to receive a coat of nonferrous metallic material. The reel 1 pays out the strip 2 in response to rotation of the rolls 7a.

The rolls 3d are followed by another bath 13 which consists of molten flux or another suitable treating medium (see FIG. 1b) and by a second deflecting roll 14 which guides the calibrated pipe 2c issuing from the mill 3 into a bath 15 of molten zinc. The flux bath 13 serves to form a coat along the external surface of the pipe 2c before the pipe enters the bath 15 of molten zinc. The arrangement is such that the roll 14 deflects the pipe 2c in downward direction because the bath 15 is located at a level below the bath 13. The bath 15 is contained in a tank 15b whose bottom is heated by a heater means including a series of gas burners 15a so that the zinc remains in molten condition and provides a protective coat around the exterior of the pipe 2c. The temperature in the bath 15 is normally in the range of 700° C. which is sufficient to melt the wire 8a contained in the interior of the calibrated pipe 2c so that the wire 8a melts and forms a pool of liquid zinc which floats in the arcuate section 2c' of the pipe 2c and forms a coat along the internal surface of this pipe owing to the provision of a bending device 16 which causes the pipe 2c to dip into the bath 15 and to thereupon advance vertically or nearly vertically upwardly and toward a further deflecting roll 18. The bending device 16 assumes the form of a segment which is angularly adjustable about a pivot 16a and along which the pipe 2c slides by friction prior to passing a measuring device 17 which is assumed to operate with gamma rays and which serves to determine the level of the pool of molten zinc which is being formed in the interior of the pipe 2c. It is preferred to locate the bending device 16 and the roll 18 in such a way that the portion of the coated pipe 2d which emerges from the bath 15 is at least nearly vertical. When the apparatus is in actual use, the bending device 16 remains stationary.

The coated pipe 2d which emerge from the bath 15 is led about the roll 18 and about a further deflecting roll 19 on its way to a final calibrating and straightening device 20 which includes a series of driven rolls and which is followed by a cutoff shear 21 of any suitable design so that the pipe 2d is automatically severed into sections of requisite length. Suitable conveyors (not shown) may be provided to advance the sections of the pipe 2d to storage or to further treating and processing stations.

An operative connection 17a between the measuring device 17 and the motor 8b for the reel 8 sends suitable impulses which automatically control the rotational speed of this reel in accordance with the measured result and with a view to maintain the surface of the pool in the interior of the arcuate pipe section 2c' below a predetermined maximum level but above a predetermined minimum level so as to make sure that the entire internal surface of the pipe 2c is coated with molten zinc.

FIG. 2 illustrates on a larger scale the hot-dipping station which includes the tank 15b with the bath 15 of molten zinc, the burners 15a (see FIG. 1b) and the stationary segment 16. The right-hand meniscus 22 of the pool 8a' of molten zinc in the pipe section 2c' is located at the level of the left-hand meniscus 24, and this level is sufficiently distant from the lowermost point of the pipe section 2c' to insure that the entire internal surface of the pipe 2d is coated with a thin protective layer 2e of constant thickness. A similar protective layer 2f is formed along the external surface of the pipe 2d. A floating body 23 of flux accumulates on the meniscus 24, and this floating body 23 is formed of the flux which is being entrained from the bath 5. The wire 8a melts on entry into the pool 8a' and serves as a continuous restorer of the pool so that the menisci 22, 24 may be maintained at an optimum level which is detected by the measuring device 17. This measuring device in turn controls the speed of the reel 8 to make sure that teh pool 8a' is not used up or that the level of this pool does not descend below the lowermost point of the stationary segment 16.

The bath 5 may be omitted if the wire 8a is coated with a suitable flux or other treating material, for example, by passing through at concentrated solution of fluxing salt. Thus, all that counts is to introduce into the pipe 2c requisite quantities of flux material which may be admitted by causing such material to adhere to the internal surface of pipe 2c or to the wire 8a.

The apparatus of FIGS. 1a and 1b is especially suited for continuous production and plating of small-caliber steel pipe with an outer diameter of up to 20 mm. It goes without saying that the coats 2e, 2f may consist of another suitable nonferrous metal or alloy, and that the apparatus may be readily converted for the production of welded pipe with a spiral seam without in any way departing from the spirit of this invention. Insofar as the coating step is concerned, and as will be explained in connection with FIG. 5, the process of the present invention may be carried out with equal facility in connection with rolled or drawn seamless pipe.

The motor 3m of the cold rolling mill 3 is of the variable-speed type and operates in synchronism with a second variable-speed motor 20m for the calibrating device 20 to regulate the thickness of protective coats 2e, 2f by adjusting the speed of the pipe 2c. The thickness and/or consistency of coats 2e, 2f is also influenced by the temperature of the bath 15 which is measured by a thermometer 15c. This thermometer is connected with an adjustable valve 15d in a conduit 15e which delivers fuel to the burners 15a so that the temperature of the bath 15 may be regulated in a fully automatic way in accordance with the result measured by the thermometer 15c or at the will of the operator.

The segment 16 causes the formation of a substantially U-shaped pipe section 2c'. This segment 16 may be replaced by a different bending device, which assumes the form of a roll or cylinder 25 shown in FIG. 3. The roll 25 causes the pipe 2c to form a convoluted or looped section 2A of circular outline while the pipe advances through the bath 15 (not shown in FIG. 3) and about a deflecting roll 18a toward the roll 18.

FIG. 3a shows a composite bending device including two vertically spaced rolls 25a, 25b which cause the pipe 2c to form a convoluted or looped section 2B of oval outline.

FIG. 3b shows another composite bending device which includes three rolls 25c, 25d, 25e causing the pipe 2c to form a truly U-shaped section 2D with two vertical legs extending upwardly from the median roll 25e. The roll 25d may replace the roll 18 of FIG. 1b.

FIG. 4 illustrates a third composite bending device 26, 27 which is provided with profiled friction-reducing rolls 28 and which causes the pipe 2c to form a section 2E of sinusoidal shape. This section 2E contains two pools of molten zinc, one in each of its pockets or troughs 29, 30, or a continuous pool whose upper level is above the level of the pipe crest 31.

The exact positioning and configuration of the bending device 16, 25, 25a–25b, 25c–25e or 26–27 influences the thickness of coats 2e, 2f by determining the duration of contact between the pipe 2c and molten metal in the bath 15. Thus, the consistency and the thickness of coats may be controlled by changing the position and/or configuration of the bending device by changing the temperature of the bath 15 and/or by changing the speed of the pipe 2c.

It will be noted that the elongated path along which the pipe moves endwise toward, through and beyond the heating station of FIGS. 1b and 2 comprises an intermediate portion (in the bath 15) which is disposed at a level below the portions located upstream and downstream thereof. Thus, the portion which is located upstream of this intermediate portion extends from the deflecting roll 14 to the level of the bath 15, and the portion located downstream of this intermediate portion extends substantially or exactly vertically from the level of the bath 15 toward the deflecting roll 18. Consequently, the pool 8a' of molten plating metal remains entrapped in and automatically coats the internal surface of the pipe section 2c', 2A, 2B, 2D or 2E.

Of course, the configuration of the bending devices must be selected by full consideration of the diameter, wall thickness and material of the pipe 2c to avoid excessive deformation of this pipe. Thus, the curvature of the pipe section 2c', 2A, 2B, 2D or 2E will depend on the maximum diameter of the pipe 2c and on the temperature of the bath 15 since the ductility of the pipe is higher at elevated temperatures such as correspond to annealing temperature of its material. As a rule, the inner diameter of the pipe 2c should at least equal the combined thickness of the coats 2e, 2f.

If the pipe is moved endwise at constant speed, if the temperature of the bath 15 is constant, and if the reel 8 rotates at constant speed to pay out a wire 8a of constant diameter, the measuring device 17 may be dispensed with. An important advantage of this measuring device is that it insures satisfactory operation of the apparatus even if the wire 8a is of non-uniform cross section.

When the apparatus of FIGS. 1a and 1b is utilized for zinc plating of steel pipe, the temperature of the bath 15 should be below the boiling or evaporation point of zinc (207° C.) but sufficiently above the melting point to insure that the pipe 2c is annealed while it passes through the tank 15b. This is achieved very satisfactorily at a temperature of about 700° C. if the pipe 2c consists of steel and is introduced into the bath 15 subsequent to treatment in the cold forming mill 3.

The process and apparatus of our invention may be utilized for plating small-caliber steel pipe with pure zinc, zinc alloys, tin, copper, cadmium, brass, bronze and the like. In all instances, the temperature of the bath in the tank 15b should be between the melting point and the boiling point of the respective plating metal. Of course, the pipe 2c may consist of a metal other than steel and the nature of the protective coat or coats may be such that their materials will react with the material of the pipe to form an alloy of desired characteristics, such as resistance to corrosion, hardness, smoothness and/or others.

It also goes without saying that the apparatus of FIGS. 1a and 1b may be used to provide the pipe 2c with a single coat of zinc or another nonferrous metal. Thus, the bath 15 may contain a fluid which will heat the wire 8a to melting temperature but which will not adhere to the external surface of the pipe 2c so that this pipe will be formed with a single coat 2e. The process may be reversed by omitting the reel 8 so that the pipe 2c is merely formed with an outer coat 2f. Furthermore, it is equally possible to heat the pipe section 2c', 2A, 2B, 2D or 2E with the help of burners or the like so that the bath 15 may be dispensed with. In such instances, and if it is desired to provide the pipe 2c with an outer coat at a point past or ahead of the bending device, one can resort to the well-known galvanizing process.

The apparatus of FIGS. 1a and 1b may comprise a bath 15 of molten metal whose composition is different from that of the wire 8a so that the coats 2e, 2f consist of different materials. For example, the external surface of the pipe section 2c' may be coated with any nonferrous metal other than zinc whose melting temperature is sufficiently high to cause melting of the wire 8a.

FIG. 5 illustrates a portion of a different apparatus which is utilized for coating the internal surface of a seamless pipe 35, such as may be produced by a drawing or rolling method. This pipe is advanced in a direction indicated by the arrow 36 and passes beneath a revolving cutter 37 whose tooth 38 pierces the pipe at predetermined intervals to form inlet openings 39 which thereupon pass through a tubular nozzle 40 of a tank 41 which contains a supply 42 of molten nonferrous metal, such as tin or zinc. The parts shown in FIG. 5 are located upstream of the bath 15 so that the material admitted through the openings 39 melts and forms the pool 8a' at the time the pipe 35 passes through the bath 15. The length of the orifice 43 in the nozzle 40 is sufficient to insure that the pipe 35 receives a requisite supply of material 42 so that the internal surface of this pipe is provided with a satisfactory coat corresponding to the coat 2e. The cutter 37 may be replaced by a suitable saw or the like which severs the upper portion of the pipe 35 at regular intervals to provide openings for admission of molten metal 42. The portions which are formed with openings 39 may be spaced at such intervals that they are thereupon severed by the shear 21 of FIG. 1b to make sure that there is no waste in the ultimate product such as could result from the formation of openings 39.

When the pipe 35 passes along the segment 16, the openings 39 will close in a fully automatic way so that the pool of molten plating metal is entrapped in that section of the pipe which advances along the segment. Such closing of openings is practically complete when the openings assume the form of transversely extending slits which are provided in the upper half of the pipe 35.

FIG. 6 illustrates a portion of a third apparatus which constitutes a modification of the apparatus described in connection with FIG. 5. The pipe 50 is guided around a bending device including a roll 51 which is mounted in a tank 52 containing a bath 53 of molten metal. A revolving cutter 54 whose teeth 55 pierce the pipe 50 at spaced intervals is located upstream of a deflecting roll 56 and serves to form openings 57 in the underside of the pipe so that such openings may admit jets of molten metal at the time the respective section 50a of the pipe passes through the bath 53. Such jets form in the section 50a a pool 58 which coats the inner side of the pipe so that the section 50b advancing substantially vertically toward the deflecting roll 18 is provided with an external coat 50c and with an internal coat 50d.

The process which may be carried out with the apparatus of FIG. 6 is of particular advantage when the pipe 50 must be provided with internal and external coats which consist of identical material and when the pipe 50 is a seamless pipe so that the introduction of a wire or of jets of molten metal at a point ahead of the bending device is a rather complicated procedure.

If desired, two or more cutters 54 may be provided to form two or more rows of openings 57.

An important advantage of our process over the galvanizing method is that the coats obtained by hot-dipping offer greater resistance to corrosion or mechanical damages. The process of our invention is also superior to certain other conventional processes according to which the coating material is sprayed onto the surfaces of the pipe or according to which the formation of internal coats is based on evaporation of coating material. The quality of sprayed or evaporation-produced coats is inferior and the thickness of the coat is not uniform in all zones of the ultimate product. Furthermore, such processes must be carried out at very high temperatures and it is normally necessary to rotate and/or otherwise agitate the pipe during the formation of such conventionally produced coats.

*Example*

The process was carried out with a steel pipe having an outer diameter of 6 mm. and a wall thickness of 0.75 mm. The material of the pipe contained up to 0.08% carbon; up to 1.5% silicon and up to 0.4% manganese. The bath 15 contained 0.07% lead, 0.06% iron and 0.01% copper, the remainder being electrolytic zinc. The wire 8a was of similar composition, and the temperature of the bath 15 was maintained at 680–700° C.

While passing through the welding bell 7d, the pipe was advanced at 20 meters per minute and its speed at the last pair of rolls 3d was 30–40 m./min. The dimensions of the tank 15b were selected in such a way that each section of the advancing pipe remained in the bath 15 for a period of 5–7 seconds. The flux contained in the bath 5 was a mixture of ammonium chloride and zinc chloride so that the floating body 23 on the meniscus 24 consisted of 49% Zn, 7% $NH_3$, 43% Cl and 0.43% Fe, the remainder (0.57%) being unsoluble. Both sides of the pipe emerging from the bath were formed with uniform coats, i.e., the period of 5–7 seconds was sufficient to melt the wire 8a and to form the pool 8a'.

If the pipe has a diameter exceeding 8 mm. and a wall thickness exceeding 1 mm., the heating time of 5–7 seconds is not sufficient to melt the rod 8a. In such instances, the apparatus preferably comprises an additional gas heater 15a' shown in FIG. 1b or an analogous preheating device. Alternatively, the roll 14 may constitute the negative electrode and the tank 15b may constitute the positive electrode of a resistance heater. Of course, it is then necessary to insulate the components 18–20 from from the ground. It is also possible to resort to induction heating whenever the wall thickness of the pipe is such that the rod 8a cannot melt while the pipe travels at normal speed.

The bath 15 may contain molten spelter containing 98.75% zinc. However, the ductility of coats obtained from molten spelter is less satisfactory.

Without further analysis, the foregoing will so fully reveal the gist of the present invention that other can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A process for the production of internally plated small-caliber metallic pipe, comprising the steps of advancing a continuous length of metallic pipe endwise along an elongated path, an intermediate portion of which path is disposed at a level below the portions which are located upstream and downstream of said intermediate portion; feeding a nonferrous plating metal into the interior of the pipe upstream of said intermediate portion of the path so that the plating metal advances toward said intermediate portion; and heating that section of the pipe which advances along said intermediate portion of the path to a temperature which is sufficient to maintain the plating metal in molten condition whereby the plating metal forms in the interior of said pipe section a pool and automatically coats the pipe so that the pipe emerging from said intermediate portion of the path is plated along the internal surface thereof.

2. A process for the production of internally plated steel pipe with a diameter of less than 20 mm., comprising the steps of advancing a continuous length of steel pipe endwise along an elongated path, an intermediate portion of which path is disposed at a level below the portions which are located upstream and downstream of said intermediate portion; feeding a corrosion-resistant nonferrous plating metal into the interior of the pipe upstream of said intermediate portion of the path so that the plating metal advances with the pipe toward said intermediate portion; heating that section of the pipe which advances along said intermediate portion of the path to a portion of the path to a temperature which is sufficient to maintain the plating metal in the interior of said pipe section in molten condition whereby the plating metal forms in the interior of said pipe section a pool and automatically coats the pipe so that the pipe emerging from said intermediatee portion of the path is plated along the internal surface thereof.

3. A process for the production of internally plated small-caliber metallic pipe, comprising the steps of advancing a continuous length of metallic pipe endwise along an elongated path an intermediate portion of which path is disposed at a level below the portions which are located upstream and downstream of said intermediate portion; feeding a nonferrous plating metal whose melting point is below the melting point of the material of the pipe into the interior of the pipe upstream of said intermediate portion of the path so that the plating metal advances toward said intermediate portion; and heating that section of the pipe which advances along said intermediate portion of the path to a temperature which is sufficient to maintain the plating metal in molten condition but which is too low to cause evaporation of plating metal whereby the plating metal forms in the interior of said pipe section a pool and automatically coats the pipe so that the pipe emerging from said intermediate portion of the path is plated along the internal surface thereof.

4. A process for the production of internally plated small-caliber metallic pipe, comprising the steps of advancing a continuous length of metallic pipe endwise along an elongated path, an arcuate intermediate portion of which is disposed at a level below the portions which are located upstream and downstream of said intermediate portion and wherein the portion immediately downstream of said intermediate portion extends upwardly in at least nearly vertical direction; feeding a nonferrous plating metal into the interior of the pipe upstream of said intermediate portion of the path so that the plating metal advances toward said intermediate portion; and heating that section of the pipe which advances along said intermediate portion of the path to a temperature which is sufficient to maintain the plating metal in molten condition whereby the plating metal forms in the interior of said pipe section a pool and automatically coats the pipe so that the pipe emerging from said intermediate portion and advancing along said vertical portion of the path is plated along the internal surface thereof and any surplus molten metal is free to flow back into said pool.

5. A process for the production of internally and externally plated small-caliber metallic pipe, comprising, the steps of advancing a continuous length of metallic pipe endwise along an elongated path an intermediate portion of which path is disposed at a level below the portions which are located upstream and downstream of said intermediate portion; feeding a nonferrous plating metal into the interior of the pipe upstream of said intermediate portion of the path so that the plating metal advances toward said intermediate portion; heating that section of the pipe which advances along said intermediate portion of the path to a temperature which is sufficient to maintain the plating metal in molten condition whereby the plating metal forms in the interior of said pipe section a pool and automatically coats the pipe so that the pipe emerging from said intermediate portion of the path is plated along the internal surface thereof; and coating the external surface of the pipe with a second layer of nonferrous metal while the pipe advances continuously along said path.

6. A process for the production of internally and externally plated small-caliber metallic pipe, comprising the steps of advancing a continuous length of metallic pipe endwise along an elongated path an intermediate portion of which path is disposed at a level below the portions which are located upstream and downstream of said intermediate portion; feeding a nonferrous plating metal into the interior of the pipe upstream of said intermediate portion of the path so that the plating metal advances with the pipe toward said intermediate portion; forming a bath of molten nonferrous metal around that section of the pipe which advances along said intermediate portion of the path; and heating said bath to a temperature which is sufficient to maintain the plating metal contained in said pipe section in molten condition whereby the plating metal forms in said pipe section a pool and automatically coats the pipe so that the pipe emerging from said bath is plated along the internal and external surfaces thereof.

7. A process for the production of internally plated small-caliber metallic pipe, comprising the steps of advancing a continuous length of metallic pipe endwise along an elongated path an intermediate portion of which path is disposed at a level below the portions which are located upstream and downstream of said intermediate portion; feeding a continuous wire of nonferrous plating metal into the interior of the pipe upstream of said intermediate portion of the path so that the wire advances toward said intermediate portion; and heating that section of the pipe which advances along said intermediate portion of the path to a temperature which is sufficient to maintain the material of the wire in molten condition whereby the resulting molten plating metal forms in the interior of said pipe section a pool and automatically coats the pipe so that the pipe emerging from said intermediate portion of the path is plated along the internal surface thereof.

8. A process as set forth in claim 7, wherein the rate of feed and the cross-sectional dimensions of the wire are such that the quantity of molten metal in the pool remains substantially unchanged.

9. A process as set forth in claim 7, further comprising the steps of measuring the level of said pool in the interior of said pipe section and adjusting the rate at which the wire is being fed toward said intermediate portion of the path in dependency on the measured result so that the level of the pool remains between predetermined upper and lower limits.

10. A process for the production of internally plated small-caliber metallic pipe, comprising the steps of advancing a continuous length of metallic pipe endwise along an elongated path an intermediate portion of which path is disposed at a level below the portions which are located upstream and downstream of said intermediate portion; forming in the pipe openings at spaced intervals while the pipe advances toward said intermediate portion of the path and feeding a nonferrous plating metal through such openings and into the interior of the pipe so that the plating metal advances with the pipe toward said intermediate portion; and heating that section of the pipe which advances along said intermediate portion of the path to a temperature which is sufficient to maintain the plating metal in molten condition whereby the resulting molten metal forms in the interior of said pipe section a pool and automatically coats the pipe so that the pipe emerging from said intermediate portion of the path is plated along the internal surface thereof.

11. A process for the production of internally plated metallic pipe with a diameter of less than 20 mm., comprising the steps of advancing a continuous length of metallic pipe endwise along an elongated path an intermediate portion of which path is disposed at a level below the portions which are located upstream and downstream of said intermediate portion; feeding predetermined quantities of zinc into the interior of the pipe upstream of said intermediate portion of the path so that the zinc advances toward said intermediate portion; heating that section of the pipe which advances along said intermediate portion of the path to a temperature of about 700° C. which is sufficient to maintain the zinc contained in the interior of said pipe section in molten condition whereby the resulting molten zinc forms in the interior of said pipe section a pool and automatically coats the pipe so that the pipe emerging from said intermediate portion of the path is plated with zinc along the internal surface thereof.

12. A process for the production of internally plated small-caliber metallic pipe, comprising the steps of advancing a continuous length of metallic pipe endwise along an elongated path an intermediate portion of which path is disposed at a level below the portions which are located upstream and downstream of said intermediate portion; feeding a nonferrous plating metal into the interior of the pipe upstream of said intermediate portion of the path so that the plating metal advances toward said intermediate portion; heating that section of the pipe which advances along said intermediate portion of the path to a temperature which is sufficient to maintain the plating metal in molten condition whereby the plating metal forms in the interior of said pipe section a pool and automatically coats the pipe so that the pipe emerging from said intermediate portion of the path is plated along the internal surface thereof; and straightening and calibrating the thus coated pipe while the pipe advances continuously along said path.

13. A process for the production of internally plated small-caliber metallic pipe, comprising the steps of producing a continuous length of small-caliber metallic pipe in a continuous operation and advancing the thus produced pipe endwise along an elongated path an intermediate portion of which path is disposed at a level below the portions which are located upstream and downstream of said intermediate portion; feeding a nonferrous plating metal into the interior of the pipe upstream of said intermediate portion of the path so that the plating metal advances toward said intermediate portion; and heating that section of the pipe which advances along said intermediate portion of the path to a temperature which is sufficient to maintain the plating metal in molten condition whereby the plating metal forms in the interior of said pipe section a pool and automatically coats the pipe so that the pipe emerging from said intermediate portion of the path is plated along the internal surface thereof.

14. A process as set forth in claim 13, wherein the pipe is produced by the seam-welding method and further comprising the steps of cold reducing the seam-welded pipe by passing the pipe through a cold rolling mill while the pipe advances in a zone located upstream of said intermediate portion of the path.

15. A process as set forth in claim 13, wherein the pipe is a seamless pipe and wherein the pipe is advanced continuously from the point of production toward, along and past said intermediate portion of the path.

16. A process for the production of internally plated small-caliber metallic pipe, comprising the steps of advancing a continuous length of metallic pipe endwise along an elongated path an intermediate portion of which is disposed at a level below the portions which path are located upstream and downstream of said intermediate portion; feeding into the interior of the pipe and at a point upstream of said intermediate portion of the path a plating metal whose melting point is above the subcritical annealing temperature of the material of the pipe so that the plating metal advances toward said intermediate portion; and heating that section of the pipe which advances along said intermediate portion of the path to a temperature which is sufficient to maintain said pipe section at subcritical annealing temperature and to maintain the plating metal in molten condition whereby the plating metal forms in the interior of said pipe section a pool and automatically coats the pipe so that the pipe emerging from said intermediate portion of the path is plated along the internal surface thereof.

17. A process for the production of internally plated small-caliber metallic pipe, comprising the steps of advancing a continuous length of metallic pipe endwise along an elongated path an intermediate portion of which path is disposed at a level below the portions which are located upstream and downstream of said intermediate portion; feeding flux and a nonferrous plating metal into the interior of the pipe upstream of said intermediate portion of the path so that flux and plating metal advance toward said intermediate portion; and heating that section of the pipe which advances along said intermediate portion of the path to a temperature which is sufficient to maintain the plating metal and flux in molten condition but which is too low to cause evaporation of molten plating metal whereby the plating metal forms in the interior of said pipe section a pool of molten metal and automatically coats the pipe so that the pipe emerging from said intermediate portion of the path is plated along the internal surface thereof, the flux which melts in the interior of said pipe section forming a layer which floats on the pool of molten plating metal.

18. A process as set forth in claim 17, wherein the flux is fed independently of plating metal.

19. A process as set forth in claim 18, wherein the flux adheres to plating metal at the time the plating metal is fed into the pipe.

20. An apparatus for the production of plated small-caliber metallic pipe, comprising means for producing a continuous length of pipe; means for advancing the pipe end-wise along an elongated path an intermediate portion of which path is disposed at a level below the portions which are located upstream and downstream of said intermediate portion; means for feeding a plating metal into the advancing pipe at a point upstream of said intermediate portion so that the metal advances toward said intermediate portion; and means for heating that section of the pipe which advances along said intermediate portion so that the plating metal melts to form a pool of molten plating metal which remains in said intermediate portion of the path and to automatically coat the internal surface of the pipe.

21. An apparatus as set forth in claim 20, further comprising bending means adjacent to said intermediate portion of the path and arranged to bend that section of the pipe which advances along said intermediate portion.

22. An apparatus as set forth in claim 21, wherein said bending means is arranged to deform the pipe section advancing along said intermediate portion of the path into a U-shaped body.

23. An apparatus as set forth in claim 21, wherein said bending means is arranged to deform the pipe section advancing along said intermediate portion of the path into a loop.

24. An apparatus as set forth in claim 21, wherein said bending means is arranged to deform the pipe section advancing along said intermediate portion of the path into a body of undulated shape.

25. An apparatus as set forth in claim 21, wherein said bending means comprises friction-reducing rollers which engage and deform the pipe section advancing along said intermediate portion of the path.

26. An apparatus for the production of plated small-caliber metallic pipe, comprising means for producing a continuous length of pipe; means for advancing the pipe endwise along an elongated path an intermediate portion of which path is disposed at a level below the portions which are located upstream and downstream of said intermediate portion; means for feeding a plating metal into the advancing pipe at a point upstream of said intermediate portion so that the metal advances toward said intermediate portion; and means for heating that section of the pipe which advances along said intermediate portion so that the plating metal melts to form a pool of molten plating metal which remains in said intermediate portion of the path and to automatically coat the internal surface of the pipe, said heating means comprising a bath of molten plating metal surrounding that section of the pipe which advances along said intermediate portion of the path and heater means for maintaining said bath at a temperature which is sufficient to maintain the metal contained in said pipe section at a temperature which is above the melting point but below the boiling point of said first mentioned plating metal whereby the pipe emerging from said bath is provided with internal and external coats of plating metal.

27. An apparatus as set forth in claim 26, further comprising means for measuring the level of molten metal in said pipe section and for regulating the rate at which molten metal is being fed into the pipe in accordance with the measured result so that the level of molten metal in said pipe section remains between a predetermined upper and lower limit.

28. An apparatus as set forth in claim 26, further comprising means for measuring the temperature of said bath and for adjusting said heater means in accordance with the measured result so that the temperature of said bath remains substantially constant.

29. An apparatus for the production of plated small-caliber seamless metallic pipe, comprising means for producing a continuous length of seamless pipe; means for advancing the pipe endwise along an elongated horizontal path an intermediate portion of which path is disposed at a level below the portions which are located upstream and downstream of said intermediate portion; cutter means located upstream of said intermediate portion and arranged to produce in the seamless pipe spaced openings which thereupon advance toward said intermediate portion of the path; means for feeding a plating metal through said openings so that such plating metal advances with the pipe toward said intermediate portion; and means for heating that section of the pipe which advances along said intermediate portion so that the plating metal melts to form a pool of molten plating metal which remains in said intermediate portion of the path and to automatically coat the internal surface of the pipe.

30. An apparatus for the production of plated metallic pipe, comprising means for producing a continuous length of pipe; means for advancing the pipe endwise along an elongated path an intermediate portion of which path is disposed at a level below the portions which are located upstream and downstream of said intermediate portion; cutter means located upstream of said intermediate portion and arranged to produce in the pipe spaced openings which thereupon advance toward and in said intermediate portion of the path; and a tank containing a bath of molten plating metal adjacent to said intermediate portion of the path so that the advancing pipe passes through said bath whereby the metal coats the exterior of the pipe and the metal also penetrates into the interior of and provides the pipe with an internal coat.

31. An apparatus as set forth in claim 30, further comprising deflecting means arranged to guide that portion of the pipe which emerges from said bath in a substantially vertical path.

32. A process for the production of internally and externally plated metallic pipe, comprising the steps of advancing a continuous length of metallic pipe endwise along an elongated path an intermediate portion of which path is disposed at a level below the portions which are located upstream and downstream of said intermediate portion; forming in the pipe openings at spaced intervals while the pipe advances toward said intermediate portion of the path; and forming a bath of molten plating metal around that section of the pipe which advances along said intermediate portion of the path whereby the metal coats the exterior and simultaneously penetrates through said openings and into the pipe to coat the interior thereof.

References Cited by the Examiner

UNITED STATES PATENTS

| | | | |
|---|---|---|---|
| 2,767,431 | 10/1956 | De Laubarede | 118—254 X |
| 2,822,291 | 2/1958 | Hahn | 117—97 |
| 3,001,889 | 9/1961 | Robinson | 117—97 X |
| 3,007,810 | 11/1961 | Hobrock | 118—254 X |
| 3,069,768 | 12/1962 | Caplan et al. | 29—460 X |
| 3,226,817 | 1/1966 | Simborg et al. | 29—460 X |

CHARLIE T. MOON, *Primary Examiner.*